United States Patent
Favreau et al.

(10) Patent No.: US 9,547,137 B2
(45) Date of Patent: Jan. 17, 2017

(54) OPTICAL COUPLER INTEGRATED ON A SUBSTRATE AND COMPRISING THREE ELEMENTS

(71) Applicant: Commissariat A L'Energie Atomique et aux Energies Alternatives, Paris (FR)

(72) Inventors: Julien Favreau, Seyssinet-Pariset (FR); Salim Boutami, Grenoble (FR); Mickael Brun, Eybens (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 14/857,223

(22) Filed: Sep. 17, 2015

(65) Prior Publication Data
US 2016/0091676 A1 Mar. 31, 2016

(30) Foreign Application Priority Data
Sep. 25, 2014 (FR) ...................................... 14 59050

(51) Int. Cl.
*G02B 6/12* (2006.01)
*G02B 6/42* (2006.01)
(Continued)

(52) U.S. Cl.
CPC ............. *G02B 6/4204* (2013.01); *G02B 6/122* (2013.01); *G02B 6/12004* (2013.01);
(Continued)

(58) Field of Classification Search
CPC .......... G02B 6/30; G02B 6/305; G02B 6/1228
See application file for complete search history.

(56) References Cited

U.S. PATENT DOCUMENTS 7,529,455 B2 * 5/2009 Suzuki ................... B82Y 20/00
385/129
8,078,020 B2 * 12/2011 Rasras ................... G02B 6/305
385/129
(Continued)

FOREIGN PATENT DOCUMENTS

GB       WO 0244772 A1 *   6/2002     ........... G02B 6/1228
WO   WO 2010033435 A2 *   3/2010     ............ B82Y 20/00

OTHER PUBLICATIONS

U.S. Appl. No. 14/677,222, filed Apr. 2, 2015, Alain Gliere et al.
(Continued)

*Primary Examiner* — Rhonda Peace
(74) *Attorney, Agent, or Firm* — Oblon, McClelland, Maier & Neustadt, L.L.P.

(57) ABSTRACT

An optical coupler integrated on a substrate, that will optically couple a laser and a waveguide and including an external element, including two arms separated by a notch, this notch being delimited laterally by two first walls at a spacing that reduces towards the bottom of the notch; a central element, located in the notch delimited laterally by two second walls and with a first region in which the two second walls are in direct contact with two first walls as far as the bottom of the notch; and an intermediate element, extending between the external element and the central element. The optical index of the central element is greater than the optical index of the intermediate element, itself greater than the optical index of the arms of the external element. Such an optical coupler provides efficient coupling between a laser emitting in the mid-infrared and a waveguide integrated on a substrate.

16 Claims, 4 Drawing Sheets

(51) Int. Cl.
*G02B 6/122* (2006.01)
*G02B 6/132* (2006.01)
*G02B 6/136* (2006.01)

(52) U.S. Cl.
CPC ........... *G02B 6/1228* (2013.01); *G02B 6/132* (2013.01); *G02B 6/4257* (2013.01); *G02B 6/136* (2013.01); *G02B 2006/12121* (2013.01)

(56) References Cited

U.S. PATENT DOCUMENTS

| | | |
|---|---|---|
| 2004/0179806 A1 | 9/2004 | Block et al. |
| 2004/0218868 A1 | 11/2004 | Liu |
| 2014/0049812 A1 | 2/2014 | Palanchoke et al. |
| 2014/0376854 A1 | 12/2014 | Brun et al. |
| 2015/0226612 A1 | 8/2015 | Palanchoke et al. |
| 2015/0316720 A1* | 11/2015 | Yang ................ G02B 6/305 385/14 |
| 2016/0091676 A1* | 3/2016 | Favreau ............ G02B 6/122 385/14 |

OTHER PUBLICATIONS

French Preliminary Search Report issued May 15, 2015 in French Application 14 59050, filed on Sep. 25, 2014 ( with English Translation of Categories of Cited Documents).

* cited by examiner

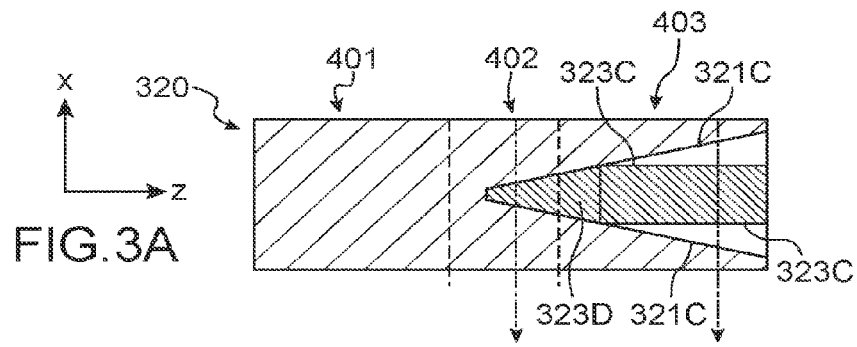
FIG.3A
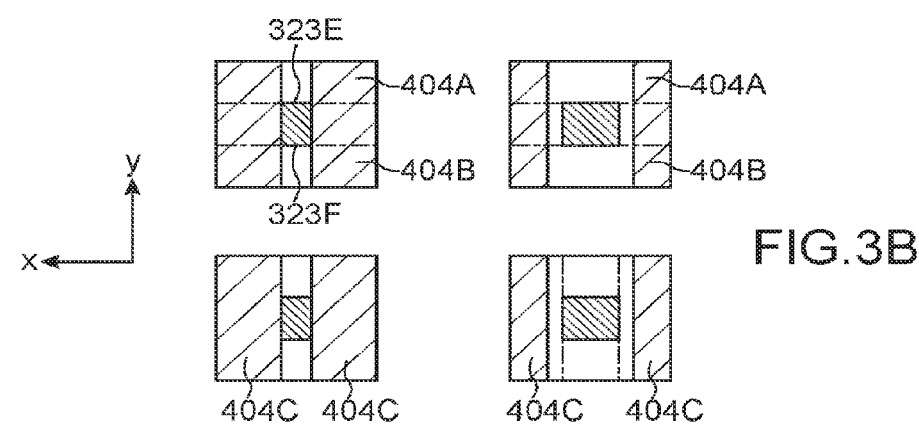
FIG.3B
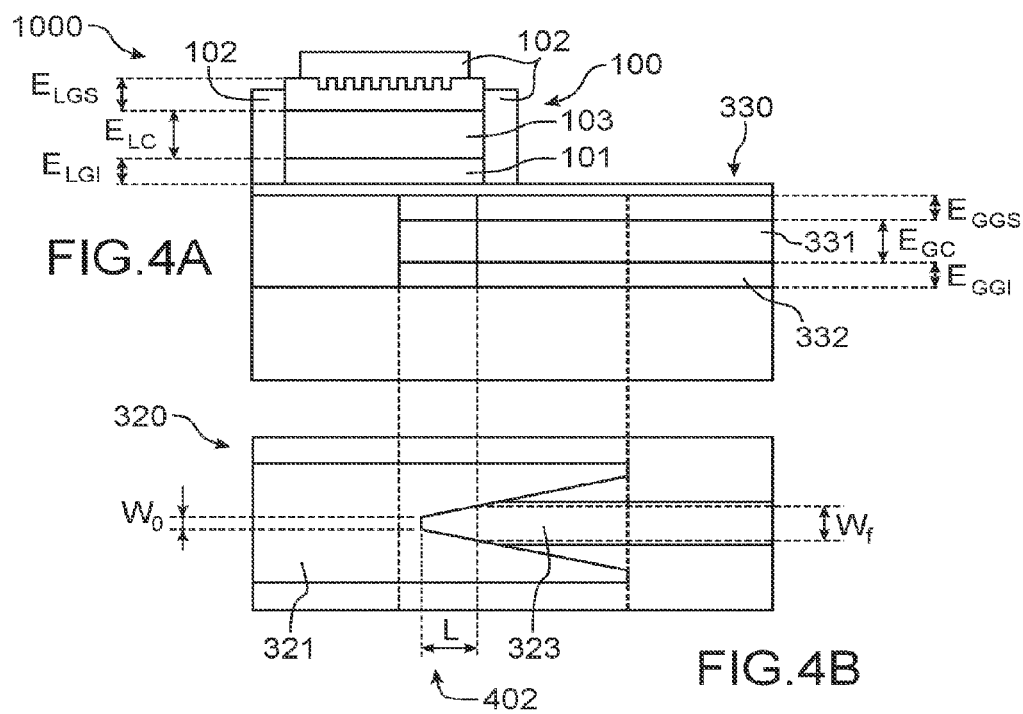
FIG.4A
FIG.4B

OPTICAL COUPLER INTEGRATED ON A SUBSTRATE AND COMPRISING THREE ELEMENTS

TECHNICAL FIELD

This invention relates to the field of integrated photonics, to make miniaturised light treatment devices in which optical and electronic devices are integrated together on the same substrate.

The invention is related more particularly to the field of couplers intended to optically couple a laser and a waveguide integrated on the same substrate.

STATE OF PRIOR ART

At the present time there is no sufficiently efficient means in the photonics field to make a light source in the material of the substrate, and this is why it is preferred to add a light source onto the substrate and to optically couple this source with a waveguide forming part of a photonic circuit made in the substrate.

For example, such coupling is used in the field of optical telecommunications to couple a light beam at 1550 nm. One example of a system making use of such coupling is shown in FIGS. 1A and 1B in a side view and a sectional view respectively.

The laser 1 is made of a III-V material, in other words it is formed from at least one element in column III and at least one element in column V in the periodic table of elements. The laser 1 is bonded above a substrate 2, in particular on top of said substrate, in which extends a waveguide with a silicon (Si) core directly surrounded by a silica cladding ($SiO_2$). A thin layer of silica is inserted between the laser 1 and the substrate 2 and acts as a molecular bonding interface between the laser and the substrate, while remaining thin enough to enable a mode transfer from the laser to the waveguide.

The laser and the waveguide are formed from materials with different optical indexes, therefore an optical coupler has to be inserted between them.

The assembly formed by the optical coupler and the waveguide forms a guide element 3 comprising a silicon core directly surrounded by a silica cladding. The system is shown in FIG. 1B, in a section view passing through this guide element 3 (cross-hatched) and parallel to the plane of the face of the substrate on which the laser 1 is deposited.

In a first region 31, the guide element is narrowed in width and the energy produced by the laser 1 remains confined in this laser. A second region 32 of the guide element has a gradually increasing width and forms the optical coupler. The optical coupler can be called a "taper" with reference to its tapered shape. A third region 33 of the guide element has a constant width and forms the waveguide.

Due to its progressively increasing width, the optical coupler makes a progressive mode transition from the laser 1 to the waveguide 33. In other words, some of the energy produced by the laser 1 is transferred to the waveguide 33. The mode transition is shown diagrammatically by the series of curves 41 to 44, illustrating the distribution of light intensity in the laser and the substrate.

Such a coupler has good performances for a laser emitting at 1550 nm. However, the same coupler cannot be used with a laser emitting at other wavelengths and particularly at more than 2 µm. Silica is strongly absorbent at these wavelengths. Therefore it is impossible to use a silica waveguide. Since the coupler is adapted to a silica waveguide, it is not adapted to such wavelengths.

One objective of this invention is to propose an optical coupler that will efficiently couple a laser and a waveguide regardless of the emission wavelength of said laser.

One particular purpose of this invention is to propose an optical coupler that will efficiently couple a laser and a waveguide, the laser emitting at a wavelength of more than 2 µm, typically between 2 and 10 µm, particularly between 3 and 10 µm and more particularly between 4 and 10 µm.

PRESENTATION OF THE INVENTION

This purpose is achieved by means of an optical coupler integrated on a substrate that will optically couple a laser and a waveguide, the optical coupler comprising:

an external element with a base starting from which two arms extend separated by a notch, said notch being delimited laterally by two first walls at a spacing that reduces towards the bottom of the notch;

a central element located in the notch, delimited laterally by two second walls and with a first region in which said two second walls are in direct contact with said two first walls to the bottom of the notch, and an intermediate element extending between the external element and the central element, directly between a first wall and a second wall where a first wall is not in direct contact with a second wall;

the optical index of the central element being greater than the optical index of the intermediate element, itself greater than the optical index of the base of the external element.

Advantageously, the intermediate element also extends inside the notch directly on an upper face and on a lower face of the central element.

The central element may be made of germanium or a germanium and silicon alloy.

Similarly, the intermediate element may be made of silicon, or a germanium and silicon alloy.

Finally, the external element may include silica, aluminium oxide or aluminium nitride or a gas such as air or a vacuum.

More particularly, a distinction can be made between two cases: one case in which the external element does not contain a gas or a vacuum and one case in which the external element does contain a gas or a vacuum.

In the first case, the external element may be composed entirely of a solid material. It may be composed entirely of the same solid material, for example silica, aluminium oxide or aluminium nitride. Preferably, it contains local pads formed of another solid material. These pads can improve thermal conductivity, as described in detail later. In the presence of pads, the optical index of the base of the external element is an average optical index.

As a variant, the external element comprises a non-solid material, particularly a vacuum or a gas such as air. In other words, it is then composed of an envelope containing a gas or a vacuum. One advantage of this variant is that much lower optical indexes are obtained.

In practice, the optical coupler is formed in a layer of solid material. Manufacturing of the external element includes the production of a recess in this layer of solid material. This recess will be covered by a laser. The recess and a lower wall of the laser, together form the envelope containing a gas or a vacuum. The layer of solid material may be the substrate in which the coupler is integrated.

Therefore, the invention relates in particular to an optical coupling element comprising a laser, and a layer of solid material in which the optical coupler according to the invention is integrated, the external element of the coupler being composed of an envelope containing a gas or a vacuum, and the envelope being formed by the recess and by a lower wall of the laser covering the recess.

The envelope may only contain a vacuum or a gas, or it may also contain pads composed of a solid material. These pads may be simply local. They can improve a thermal conductivity as described in detail later. When the external element includes pads surrounded by a vacuum or a gas such as air, it can be considered that it forms a porous material.

The optical coupler is advantageously composed of three slices, or wafers, extending one after the other comprising:
  a first slice, or wafer, that will be located under the laser except for an exit region of the laser, and composed of at least part of the base of the external element;
  a second slice, or wafer, directly adjacent to the first slice, and that will be located under said exit region of the laser, and comprising one end of the central element; and
  a third slice, or wafer, directly adjacent to the second slice.

The optical coupler will advantageously optically couple a laser and a waveguide, such that the optical index of the first slice is less than the effective index of the laser, and such that the optical index of the intermediate element is greater than the effective index of the laser.

The material of the first slice may for example consist of a matrix made of silica in which pads containing germanium and silicon are integrated.

As a variant, the material of the first slice consists of pads containing germanium and silicon, surrounded by a vacuum or a gas such as air.

The optical coupler is advantageously designed to optically couple a laser and a waveguide such that:
  the effective index in the second slice gradually increases from the entry to the exit of the second slice, from a face adjacent to the first slice as far as a face adjacent to the third slice;
  the effective index at the entry to the second slice is less than the effective index of the laser; and
  the effective index at the exit from the second slice is greater than the effective index of the laser.

The optical coupler is advantageously also designed to optically couple a laser and a waveguide such that:
  a region of the optical coupler with the same width as the optical coupler, located under the central element and in direct contact with its lower face, defines a lower cladding of the coupler;
  a region of the optical coupler with the same width as the optical coupler, located on the central element and in direct contact with its upper face, defines an upper cladding of the coupler; and
  at the exit from the second slice, the equivalent optical index of the lower cladding of the coupler and the equivalent optical index of the upper cladding of the coupler are each less than the effective index of the laser.

The optical coupler is advantageously designed to optically couple a laser and a waveguide such that:
  a region of the optical coupler with the same width as the optical coupler, located under the central element and in direct contact with its lower face, defines a lower cladding of the coupler; and
  the thickness of the lower cladding of the coupler is greater than or equal to $\lambda_0/2$, where $\lambda_0$ is the laser emission wavelength in a vacuum.

The optical coupler is advantageously designed to optically couple a laser and a waveguide such that the effective index in the third slice progressively increases from the entry in the third slice to the exit from the third slice, until it reaches the value of the effective index of the waveguide.

The optical coupler may be designed particularly to optically couple a quantum cascade laser and a waveguide.

The invention also relates to a method of manufacturing an optical coupler like that disclosed above, said process including the following steps:
  deposit a first layer on a substrate, said first layer being intended to form the central element, and etch the first layer;
  deposit a second layer covering the first etched layer and planarise the second layer;
  etch at least the first layer to form a recess surrounding (laterally) one end of the etched first layer;
  possibly fill the recess to form the external element of the optical coupler.

Finally, the invention relates to an optical guidance system integrated onto a substrate it comprises:
  an optical coupler like that described above;
  a waveguide located along the prolongation of the optical coupler such that a core of said waveguide extends along the prolongation of the central element and is formed from the same material, and a cladding of said waveguide extends along the prolongation of the intermediate element and is formed from the same material; and
  a laser, located above at least part of the optical coupler; the optical coupler being designed to optically couple said laser and said waveguide.

BRIEF DESCRIPTION OF THE DRAWINGS

This invention will be better understood after reading the description of example embodiments given purely for information and that are in no way limitative with reference to the appended drawings in which:

FIGS. 3A and 3B illustrate the optical coupler as represented in FIGS. 2A to 2C;

FIGS. 4A and 4B diagrammatically illustrate a second embodiment of a system comprising an optical coupler according to the invention;

DETAILED PRESENTATION OF PARTICULAR EMBODIMENTS

We will firstly illustrate a first embodiment of an optical guidance system 1000, integrated onto a substrate and comprising an optical coupler according to the invention.

The coupler according to the invention is adapted particularly to couple a laser emitting at a wavelength between 2 and 10 μm, and a waveguide integrated onto a silicon substrate.

Figure 1A:
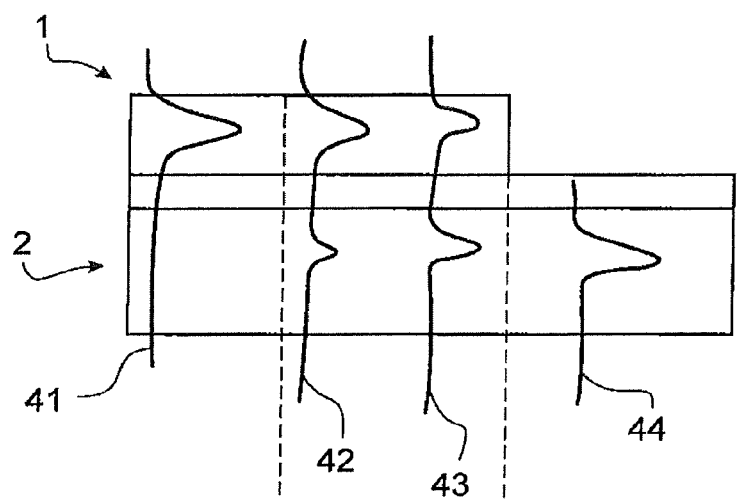
FIGS. 1A and 1B diagrammatically illustrate a system comprising an optical coupler according to prior art.
Figure 1B:
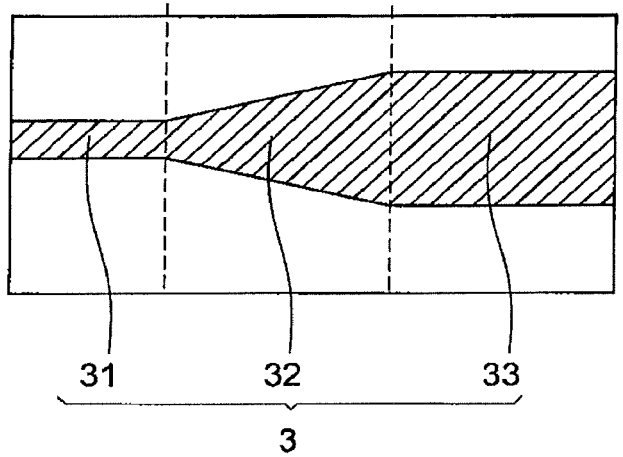
Figure 2A:
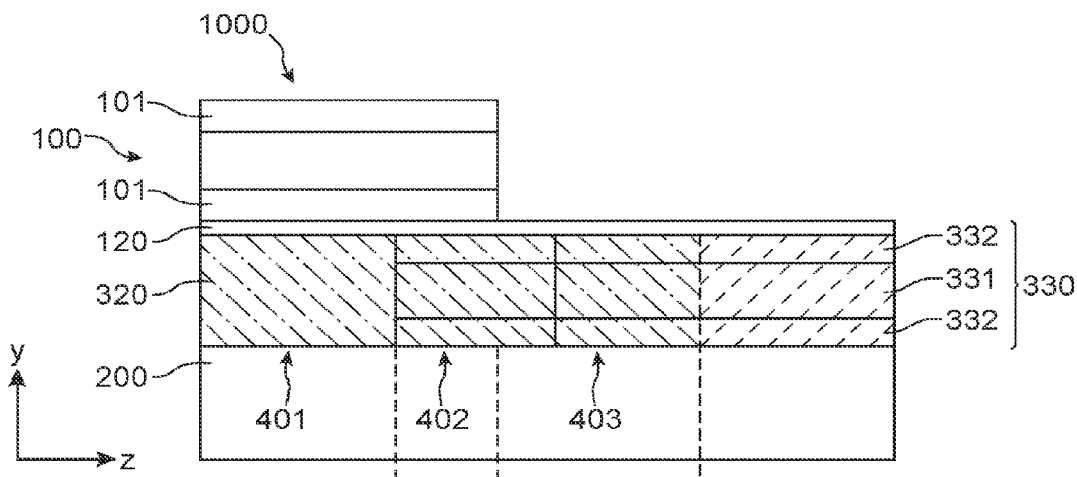
FIGS. 2A to 2C diagrammatically illustrate a first embodiment of a system comprising an optical coupler according to the invention.
Figure 2B:
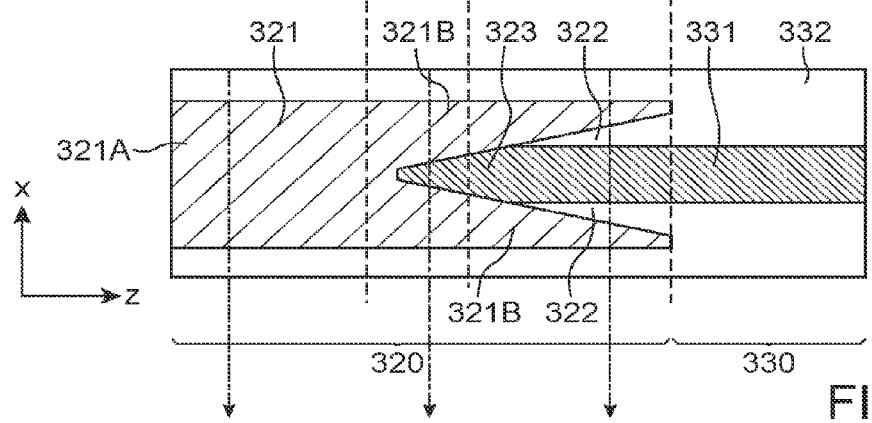
Figure 2C:
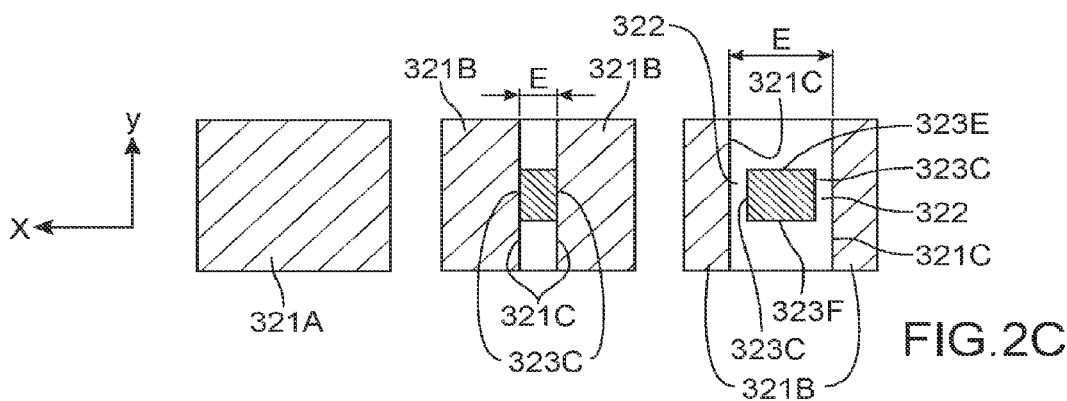

Consider an orthonormal coordinate system (Oxyz), FIG. 2A shows a side view of this system in the (zOy) plane, FIG. 2B is a sectional view in a plane parallel to the (zOx) plane passing through the centre of the optical coupler, and FIG. 2C shows three sectional views in planes parallel to the (xOy) plane for different values of z. Lengths run along the (Oz) axis that extends parallel to the propagation direction of a light beam in the waveguide as described below. Heights run along the (Oy) axis that extends parallel to the direction of stacking the laser on the substrate as described below. Widths run along the (Ox) axis.

The optical guidance system 1000 comprises a laser 100 emitting in the mid-infrared, for example at a wavelength of between 2 and 10 µm, and particularly between 3 and 10 µm and more particularly between 4 and 10 µm.

In this case the laser 100 is a III-V laser formed by an active waveguide. The cladding 101 of this active guide is made of indium phosphide (InP). The laser 100 is preferably a quantum cascade laser (QCL), in which quantum wells are used for the emission of photons in the mid-infrared starting from an excitation by electrons. The laser 100 is made on the top of a substrate in which a waveguide and an optical coupler according to the invention are integrated. In particular, the laser is above at least part of the optical coupler according to the invention.

The substrate 200 may be made of glass, silicon, or a III-V material such as InP. It is preferably a silicon substrate, since silicon can efficiently co-integrate optical and electronic elements.

The optical guidance system 1000 comprises a waveguide 330 forming a passive guide in the substrate. Throughout the remainder of this description, the term "waveguide" denotes the passive waveguide 330. The waveguide 330 is adapted to propagate a light beam at a wavelength of more than 2 µm, without absorption. Throughout the remainder of this description, all effective indexes and optical indexes denote refraction indexes in the mid-infrared.

Throughout the text, it is considered that propagation without absorption means absorption of less than 1 dB/cm.

As a reminder, the effective index of a mode, and particularly the effective index of a waveguide mode, is defined as follows:

$$n_{\mathit{eff}} = \beta * \frac{\lambda}{2\pi}$$

where $n_{\mathit{eff}}$ is the effective index of the mode considered, $\lambda$ is the wavelength of the light beam propagating in this medium and $\beta$ is the phase constant of this medium. The phase constant $\beta$ depends on the wavelength and the mode of the light beam propagating in this medium, and on the properties of this medium (particularly the indexes and the geometry). The phase constant $\beta$ is defined by:

$$A(z)=A(0)\exp(\gamma z)$$

where $A(z)$ is the complex amplitude as a function of z of a light beam propagating in a medium such as a waveguide, and $\beta$ is the imaginary part of $\gamma$.

Throughout the text, the term "effective index" denotes the effective index of the fundamental mode of the light beam propagating in this medium, at the central wavelength of this light beam. The fundamental mode is the zero order mode, usually quasi-Gaussian.

It may sometimes be considered that the effective index denotes the average optical index of the medium as it is "seen" by a mode of the light beam propagating in this medium. To facilitate understanding, such an image will be used in the following explanations without prejudice to the rigorous definition given above.

In the waveguide, the fundamental mode extends principally in the core on which it is centred and also projects on the cladding such that the effective index of the mode in the waveguide is an intermediate value between the core index and the index of the cladding.

The waveguide 330 does not contain any silica so that it is not absorbent at wavelengths between 2 and 10 µm. It is preferably a waveguide with a germanium or germanium and silicon alloy core 331, and a silicon or germanium and silicon alloy cladding 332. The materials for the core 331 and the cladding 332 are chosen such that the optical index of the core 331 is greater than the optical index of the cladding 332. The optical index of silicon is equal to about 3.4. The optical index of silicon-germanium with 40% germanium is equal to about 3.6. Thus, the effective index in the waveguide is greater than 3.4, for example it is of the order of 3.5.

Silicon and germanium, and alloys containing these two elements, are perfectly compatible with other known epitaxial manufacturing processes.

The cladding 332 is preferably entirely formed by the material of the substrate.

The waveguide 330 is located in the extension (in other words, along the prolongation) of an optical coupler 320 that is also integrated in the substrate. The waveguide 330 shown in FIG. 2A is shown in dashed cross-hatching and the optical coupler 320 is shown in chain-dotted cross-hatching.

The optical coupler is preferably in the form of a rectangular parallelepiped with the same width as the laser. It is intended to be located partly under the core of the laser.

The optical coupler 320 comprises:
- an external element 321, shown in wide cross-hatching in FIGS. 2B and 2C;
- an intermediate element 322; and
- a central element 323, shown in narrow cross-hatching in FIGS. 2B and 2C.

The external element 321 is made from a first material called a low index material. The following description gives more details about the optical index of the external element 321. The length of the external element defines the length of the optical coupler according to the invention.

The external element 321 has a base 321A starting from which two arms 321B extend. In particular the base has a rectangular parallelepiped shape. FIG. 2C at the left shows a sectional view of the optical coupler in a plane passing through this base. The base is intended to be located entirely under the laser 100.

The space between the two arms 321B is called the "notch". The notch is delimited laterally by two first walls 321C each belonging to one of the arms 321B. Each first wall is defined by a generating line extending in a plane parallel to the (zOx) plane and by a height.

The distance between both first walls 321C progressively increases, as the distance from the bottom of the notch increases. In FIG. 2C, at the centre, there is a sectional view of the optical coupler in a plane passing through this notch close to the bottom of the notch. FIG. 2C at the right shows a sectional view of the optical coupler in a plane passing through this notch, close to the entry to the notch. It can be clearly seen that the distance E between the two first walls increases as the distance from the bottom of the notch increases, this distance being defined along the (Ox) axis.

In the example shown in FIGS. 2A to 2C, the first walls 321C are plane, and the distance between them increases linearly. However, the first walls 321C may have any other non-plane shape such that the distance between the first walls increases monotonically.

The two arms are preferably symmetric about a plane parallel to the (xOy) plane passing through the bottom of the notch.

The central element 323 is located inside the notch. It is made from a second material identical to the material of the core 331 of the waveguide. It is delimited laterally by two second walls 323C. Each second wall is defined by a generating line extending in a plane parallel to the (zOx) plane and by a height.

In a first region 323D (see FIG. 3A), the distance between the two second walls 323C decreases as the distance from the bottom of the notch decreases. Once again, the distance corresponds to a distance along the (Ox) axis. In this first region 323D, the two second walls 323C are also in direct contact with the two first walls 321C, as far as the bottom of the notch. Therefore the central element 323 is tapered at the bottom end of the notch, and is surrounded laterally by the external element 321, and then gradually becomes wider such that the external element 321 progressively leaves the space for the central element 323. In the first region 323D, the central element 323 fills the notch entirely, between a first height and a second height in the notch.

Consequently in the first region 323D, the shape of each second wall 321C corresponds to the shape of the first wall with which it is in direct contact. Thus, the distance between the second walls 323C increases monotonically in the first region 323D, and for example increases linearly.

FIG. 2C at the centre represents a sectional view of the optical coupler in a plane passing through this region 323D. Each wall 323C is in direct contact with a wall 321C. FIG. 2C at the right shows a sectional view of the optical coupler in a plane passing outside this region 323D. As will be described later, part of the intermediate element 322 is inserted between a wall 323C and a wall 321C.

Outside the region 323D, the second walls 323C preferably have a constant distance between them. At the exit from the optical coupler, the central element 323 is coincident with the core 331 of the waveguide 330. Thus, the distance between the second walls 323C at the exit from the optical coupler is equal to the width of the core 331 of the waveguide 330. In other words, at the exit from the optical coupler the core of the waveguide extends in the extension of the central element.

Preferably, the two second walls 323C are symmetric about a plane parallel to the (xOy) plane passing through the bottom of the notch.

The intermediate element 322 is formed from a third material identical to the material forming the cladding 332 of the waveguide. The intermediate element 322 is preferably made of silicon, like the substrate. The intermediate element 322 extends on each side of the central element 323, directly between a first wall 321C and a second wall 323C. The intermediate element extends outside the region 323D.

At the exit from the optical coupler, the intermediate element 322 is coincident with the cladding 332 of the waveguide 330. Thus, at the exit from the optical coupler, the cladding of the waveguide extends in the extension of the intermediate element.

The optical index of the central element 323 higher than the optical index of the intermediate element 322 that is itself higher than the optical index of the arms of the external element 321.

The optical index of the external element 321 may for example be less than 2, or even less than 1.5. It may be less than half the optical index of the central element 323.

To achieve this, the external element may be made of aluminium nitride (AlN), that is not very absorbent at wavelengths longer than 2 μm, and it also has the advantage that it is an excellent conductor of heat.

As a variant, the external element is made of silica. Silica is absorbent at wavelengths longer than 2 μm, but this absorption can be tolerated because the length of the external element is short (which is not the case for the waveguide which must not contain any silica). Furthermore, the portion of the external element that will be located under the laser is partially isolated from the laser core by the lower cladding of the laser, which makes the laser less sensitive to absorption by silica.

Also as a variant, the external element may be made of an aluminium oxide ($Al_2O_3$).

According to another variant, the external element is composed of air or even a vacuum. It is delimited by the walls of a recess formed in the material of the substrate and by a lower wall of the laser 100 that closes the recess.

The central element 323 and the intermediate element 322 of the coupler are formed from the same materials as the core, respectively the cladding of the waveguide 330. Together, they participate in coupling to the waveguide 330, this waveguide being adapted to propagate a light beam at a wavelength of between 2 and 10 μm without absorption.

Variations in the width of the central element 323, the intermediate element 322 and the external element 321 are progressive. Consequently, the effective index of the optical coupler is varied progressively, enabling an adiabatic mode transition from the laser 100 to the waveguide 330 at a wavelength of between 2 and 10 μm. This transition in the laser mode refers to the transfer into the waveguide, of at least part of the power of the fundamental mode of the laser, to the zero order mode of the waveguide, usually the zero order quasi-Gaussian mode.

The base of the external element 321 is adapted to be placed under at least part of the laser. The optical index of the base of the external element 321 is less than the optical index of the intermediate element 322.

In particular and as described in the following, the optical index of the intermediate element 322 is higher than the effective index of the laser, and the optical index of the base of the external element is less than the effective index of the laser. Thus, when the optical index of the substrate is higher than the effective index of the laser, the base of the external element that is intended to be placed between the laser and the substrate prevents losses by optical leak from the laser to the substrate. It will be noticed that the intermediate element is advantageously formed in the material of the substrate. In this case, if the optical index of the substrate is higher than the effective index of the laser, then the optical index of the intermediate element is higher than the effective index of the laser.

In practice, the effective index of a laser emitting at a wavelength between 2 and 10 μm is usually less than the optical index of the cladding of a waveguide adapted to propagate the principal mode of a beam emitted by such a laser. Since the intermediate element 322 is formed from the same material as the cladding of the waveguide 330, the effective index of the laser is then less than the optical index of the intermediate element. Therefore the external element 321 is necessary to enable that an element with an optical index less than the effective index of the laser is located under the laser.

The optical index of the intermediate element 322 is higher than the effective index of the laser. If the material of the intermediate element were at the location of the external element, there would be an optical leak from the laser to the substrate, without coupling to the waveguide. Therefore the presence of the external element and particularly its base is essential. The arms of the external element enable an adiabatic mode transition from the laser to the waveguide, even in the presence of this base of the external element. These arms help to initiate optical coupling between the laser and the waveguide. They are at least partly located in an optical coupling initiation zone under the laser.

Therefore, the optical coupler according to the invention can optically couple a laser and a waveguide, even if a priori this is not possible with the substrate and the waveguide. In particular, the coupler can couple a laser emitting at a central wavelength between 2 and 10 μm and with an effective index of less than 3.3, and a waveguide for which the index of the cladding is higher than 3.3, particularly when the substrate is made of silicon.

It can be considered that the coupler according to the invention has a double tip, a first tip corresponding to the tapered end of the central element, and a second tip corresponding to the tapered end of the intermediate element, the second tip being placed around the first tip.

In the advantageous embodiment shown in FIGS. 2A to 2C, the intermediate element 322 also extends between the arms of the external element 321 above and below the central element 323. In other words, the intermediate element 322 also extends in direct contact with a top face 323E of the central element, on the side of the substrate in which the laser is realized, and in direct contact with a lower face 323F of the central element opposite to the side of the substrate in which the laser is realized. These direct contacts extend over the entire upper face and lower face of the central element. The height of the external element 321 is greater than the height of the central element 323, the central element is centred in height inside the external element and the intermediate element 322 and the central element 323 together fill the entire notch formed in the external element 321.

We will now present details of different relations that can exist between the optical indexes in the optical coupler in the laser and in the waveguide, with reference to FIGS. 3A and 3B.

FIG. 3A is a detailed view of FIG. 2B showing the optical coupler alone. The two figures at the left in FIG. 3B correspond to the central figure in FIG. 2C. The two figures at the right in FIG. 3B correspond to the right figure in FIG. 2C.

Three wafers, or slices, are defined in the optical coupler, the different slices being parallel to each other and parallel to the (xOy) plane.

A first slice 401 is intended to be located under the laser 100 except for a laser exit region (see FIG. 2A). The laser exit region is located on a lower face of the laser bonded onto the substrate. This exit region is located at one end of the laser, considered along the direction of the length. Preferably, the laser 100 is a rectangular parallelepiped and the exit region is a rectangle extending over the entire width of the laser, at one end of it. The laser exit region is located on the side of the waveguide.

The laser exit region preferably covers at least 30% of the surface of the lower face of the laser.

The first slice 401 is formed in the base 321A of the external element. Preferably, the first slice 401 and the base 321A are coincident. The first slice is advantageously composed of the same material as the arms of the external element 321, for example aluminium nitride (AlN) or silica (SiO$_2$).

As a variant, the first slice is composed of silica in which pads containing germanium and silicon are formed. To prevent any diffraction phenomenon, the maximum width of these pads is less than λ/4, where λ is the central emission wavelength of the laser. These pads may be distributed on a periodic mesh, with a periodicity of less than λ/2. These pads are formed by keeping part of the stack of layers forming the waveguide at some locations, during fabrication of an optical guidance system according to the invention. Therefore each pad corresponds to a stack of the cladding material, the core material and the waveguide cladding material, for example by a stack of silicon, silicon and germanium alloy, and silicon. The pads can improve the thermal conductivity of the first slice 401. This thus prevents overheating of the laser that could prevent normal operation. Preferably, the remainder of the external element is made of pure silicon.

As another variant, the first slice is composed of an envelope filled with vacuum or a gas such as air, and with such pads.

The optical index of the first slice 401 is less than the effective index of the laser, and the optical index of the substrate is higher than the optical index of the laser. Thus, the first slice 401 inserted between the laser and the substrate prevents any optical leak from the laser to the substrate and without coupling to the waveguide. Therefore this first slice 401 forms an optical isolation zone between the laser and the substrate. For example, the optical index of the substrate is equal to 3.4 when this substrate is made of silicon and the effective index of the laser is equal to 3.2. Throughout the text, an optical index can simply be called an "index".

Furthermore, the optical index of the intermediate element is higher than the effective index of the laser. If the material of the intermediate element were at the position of the external element, there would be an optical leak from the laser to the substrate without coupling to the waveguide. Therefore, the presence of the external element and particularly its base is essential.

When the first slice 401 is made of silica with pads as described above, the average optical index in the first slice can be slightly higher than the index of silica but it remains nevertheless less than the effective index of the laser. The difference between the average optical index in the first slice and the optical index in the remainder of the external element is sufficiently low to prevent a sudden change in the index causing optical losses. The difference in index may for example be less than 20%.

A second slice 402 directly adjacent to the first slice 401 is intended to be located under the laser exit region as defined above (see also FIG. 2A).

The second slice 402 comprises at least part of the central element and part of the external element. In particular, the second slice 402 includes the tapered end of the central element located at the contact of the first walls 321C of the external element. In the example shown in the figures, the two first walls 321C of the external element and the two second walls 323C of the central element are in direct contact over the entire second slice. According to one variant not shown, this second slice 402 comprises a portion of the intermediate element.

The second slice is both an isolation zone due to the presence of the external element, and an optical coupling zone due to the presence of the central element.

The effective index in the second slice, at the entry in the second slice 402, on the side of the first slice 401, is less than the effective index of the laser. In the second slice 402, a beam originating from the principal mode of the laser spreads over a certain area. This beam corresponds to a portion of the principal mode of the laser transferred in the second slice. At the side of the first slice, a small proportion of this area is in the central element and a large proportion is in the external element. Due to the progressive increase in the width of the central element as the distance from the first slice increases, the proportion of this area located in the central element increases and the proportion of this area located in the external element reduces. Consequently, the effective index in the second slice increases progressively as the distance from the first slice 401 increases. This effective index increases until it reaches the effective index of the laser. When this equality has been obtained, coupling between the laser and the optical coupler is achieved. It is preferred that the effective index at the exit from the second slice is slightly higher than the effective index of the laser, for example by a few percent, to improve technological robustness. Thus, coupling between the laser and the waveguide is achieved by effective index matching. The second slice 402 thus forms an optical coupling zone.

In order to have a sufficient influence on the value of the effective index in the second slice, the index of the external element must be sufficiently small relative to the index of the central element, typically half as much.

The progressiveness of the increase in the effective index prevents leaks that would occur in the case of a sudden change of index. Preferably, this increase in the effective index corresponds to an increase in the distance between the second walls 323C that slowly increases relative to the central wavelength at which the laser emits. For example, the angle formed in the region 323D between the two second walls 321C is less than $10^{-3}$ rad.

Other conditions may be verified. This is done by defining lower, upper and lateral cladding of the optical coupler.

The upper cladding 404A of the coupler corresponds to a region of the optical coupler located in direct contact with the top face 323E of the central element and with the same width as the optical coupler. This width is preferably equal to the width of the laser. The upper cladding 404A corresponds particularly to a region located above the central element and delimited by a wall with the same width as the coupler and with the same generating line as one of the second walls 323C of the central element. The upper cladding 404A comprises part of the external element at its two ends. The material of the intermediate element is preferably located in the middle. The length of the upper cladding corresponds to the length of the central element.

The lower cladding 404B of the coupler is defined in a similar manner, located in direct contact with the lower face 323F of the central element.

The side claddings 404C are also defined with the same height as the coupler, and each of them is in direct contact with a sidewall of the central element. In the region 323D, the side claddings are formed entirely in the external element. Outside this region, the side claddings are formed in the external element and the intermediate element. In the example shown in the figures, in the second slice, side claddings are entirely formed in the external element.

The two figures at the top in FIG. 3B illustrate the top and bottom claddings of the coupler, and the two figures at the bottom illustrate the side claddings of the coupler.

As the distance from the first slice 401 increases, the proportion of the external element in the lower cladding 404B decreases. Thus, the equivalent optical index of the lower cladding increases. The equivalent optical index of a medium refers to its average optical index, in other words the average of the indexes of zones forming this medium, weighted by the volumes of these zones, in which each zone corresponds to a material with a different nature. The equivalent optical index of the lower cladding 404B is advantageously less than the effective index of the laser everywhere under the laser 100. To achieve this, the second slice 402 must be arranged such that the equivalent optical index of the lower cladding 404B at the exit from the second slice is less than the effective index of the laser. This prevents the principal mode of the laser from passing through the lower cladding 404B, without coupling in the optical coupler. In other words, this prevents the laser mode from leaking directly into the substrate. Preferably, the upper cladding 404A satisfies this same condition.

In FIG. 3B, the upper and lower claddings are formed from AlN on the sides and silicon in the centre. The equivalent optical index of these claddings in the two figures at the left is 3.1. In the two figures at the right, the equivalent optical index of these two claddings is 3.2. This thus illustrates the increase in the equivalent optical index of the lower and upper claddings, as the distance from the first slice 401 increases.

At the entry into the second slice 402, the beam propagating in said slice (corresponding to a portion of the fundamental mode of the laser transferred at the entry to the second slice) extends partly in the external element with a low index. Thus, at the entry into the second slice 402, it is possible that the effective index in the second slice is less than the index of the substrate. Under these conditions, this prevents an optical leak towards the substrate due to the high thickness (dimension along the (Oy) axis also called the height) of the lower cladding 404B. In particular, the thickness of the lower cladding 404B is higher than or equal to $\lambda_0/2$, where $\lambda_0$ is the laser emission wavelength in a vacuum.

Therefore the lower cladding 404B of the coupler provides optical isolation between the coupler and the substrate. The second slice 402 thus forms an optical isolation zone.

The length of the second slice is preferably less than 5 mm. Thus, poor thermal conductivity of the material of the external element is not a problem.

A third slice 403 is directly adjacent to the second slice 402, without any part of the laser located above it (see also FIG. 2A).

In the third slice 403, a beam originating from the principal laser mode extends over a certain area. This beam corresponds to a portion of the principal mode of the laser transferred into the second slice and then into the third slice. At the side of the second slice, in other words at the entry into the third slice, this area extends over part of the central element, part of the external element and possibly part of the intermediate element. The distance between the external element and the central element increases as the distance from the second slice increases such that the proportion of the external element in this area decreases, and the proportion of the intermediate element (and possibly the central element) increases. Thus, the effective index in the third slice progressively increases between the entry to and the exit from the third slice, until it becomes close to and even equal to the effective index of the waveguide. The progressive increase in the effective index in the third slice 403 makes an adiabatic mode transformation to the waveguide. In other words, the beam originating from the principal mode of the laser transferred into the second slice and then to the entry into the third slice, is progressively brought into the entry of the waveguide, without any excessive sudden changes in the index. Preferably, this increase in the index corresponds to a distance between the first walls 321C that increases slowly relative to the central laser emission wavelength, which means an angle between the first two walls 321C less than $10^{-3}$ rad.

When the effective index in the third slice reaches the value of the effective index of the waveguide, the presence of the external element is no longer necessary. This condition provides a means of defining the length of the external element and therefore the length of the optical coupler according to the invention.

Thus, the external element 321 provides optical isolation between the laser and the substrate, and also progressive matching of the effective index in the coupler until it reaches the effective index of the waveguide 330.

In the example shown in the figures, the central element in the third slice 403 still widens and the intermediate element gradually appears.

Therefore in the second slice 402 and then the third slice 403, the optical coupler 320 makes optical coupling of the laser 100 to the waveguide 330 and provides adiabatic mode matching, in other words by progressive variation of the index so as to prevent losses by reflection, diffusion and transfer to higher order modes.

The optical coupler 320 also prevents optical leaks from the laser to the substrate.

FIGS. 4A and 4B diagrammatically show a second embodiment of the system 1000 comprising an optical coupler according to the invention.

FIG. 4A corresponds to FIG. 2A, in which a few clarifications about the laser 100 have been made. FIG. 4B corresponds to FIG. 2B, without cross-hatching to make it easier to read.

The laser 100 has a lattice structure called the top-DFB (Distributed FeedBack) on its upper face. This structure enable fixing the emission wavelength of the laser 100. The top face and the side faces of the laser are covered with a highly reflecting coating 102, for example a metallic and particularly a gold coating. Thus, the laser emission does not take place through a side wall but through the lower face, in the exit region as defined with reference to FIG. 3A.

FIGS. 4A and 4B show a particular example of system and coupler according to the invention, and particularly dimensions.

The laser 100 has the following characteristics:
central emission wavelength: 4.5 µm;
lower cladding and upper cladding 101 (and side cladding) made of InP, index 3.1;
core 103 (active zone) made of AlInAs and GaInAs alloy, index 3.37;
effective index of the laser: 3.23;
core thickness $E_{LC}$: 1.5 µm;
upper cladding thickness $E_{LGS}$: 3 µm;
lower cladding thickness $E_{LGI}$: 1 µm (this thickness is preferably less than or equal to 1 µm, to avoid the laser from being entirely isolated from the coupler which would prevent optical coupling);
core width: 4 µm.

The waveguide 330 has the following characteristics:
index of the silicon cladding 332: 3.4;
index of the core 331 made of silicon (60%) and germanium (40%) alloy: 3.6;
effective index of the waveguide: 3.46
core thickness $E_{GC}$: 2.5 µm;
upper cladding thickness $E_{GGS}$: 0.5 µm;
lower cladding thickness $E_{GGI}$: 2 µm;
core width: 3 µm.

The optical coupler 320 has the following characteristics:
external element 321 made of silica with optical index 1.44;
minimum width $W_0$ of the central element 323: 0.5 µm;
width $W_f$ of the central element at the exit from the second slice: 1.4 µm;
length L of the second slice 402: 2000 µm.

Figure 5:
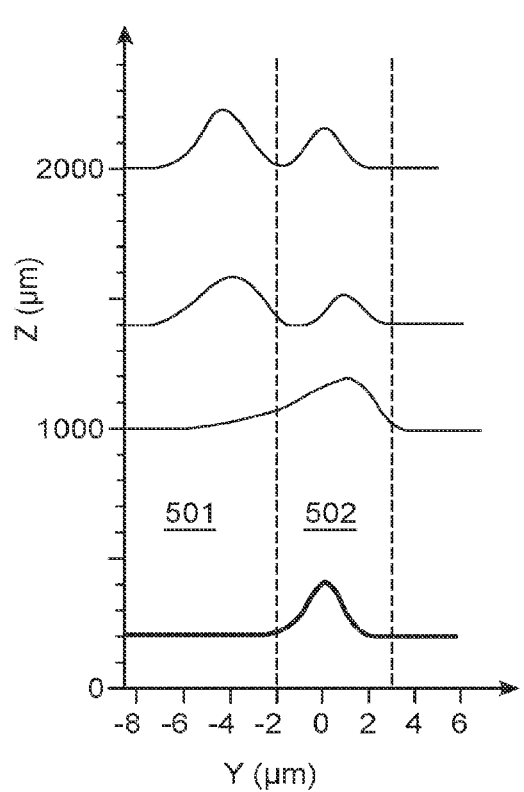
FIG. 5 illustrates optical coupling made using an optical coupler according to the invention.

FIG. 5 diagrammatically shows optical coupling made by an optical coupler according to the invention.

Zone 501 corresponds to the optical coupler and zone 502 corresponds to the laser located above it. The (Oz) axis extends over the entire length of the second slice. It can be seen that part of the principal mode of the laser is progressively coupled in the optical coupler, from the entry to the exit of the second slice. At the exit from the second slice, the distribution of optical power between the optical coupler and the laser may for example be of the order of 50%-50%, for example 45%-55%. This incomplete coupling makes it possible to keep a Fabry-Perot effect in the laser, normally achieved due to partial reflection of the laser exit wall. Finally, 45% for example of the optical power of the laser is transmitted in the waveguide, using the optical coupler according to the invention.

It can be shown that the coupling efficiency increases with the length of the second slice. This efficiency also depends on the widths $W_0$ and $W_f$ of the central element defined above. These widths determine effective indexes at the entry to and exit from the second slice.

In particular, if the width $W_f$ of the central element at the exit from the second slice is less than a limiting value, the condition according to which the effective index of the laser is equal to the effective index at the exit from the second slice is not achieved. In this case, coupling is not achieved. The lower limiting value of $W_f$ is about 1.1 µm, under the conditions shown in FIGS. 4A and 4B.

When the width $W_f$ of the central element at the exit from the second slice increases, the equivalent optical index of the upper cladding of the coupler and of the lower cladding of the coupler can be higher than the effective index of the laser (because the proportion of the external element in the upper and the lower cladding is then very small). The principal mode of the laser leaks into the substrate which reduces the coupling efficiency. An upper limiting value of $W_f$ is about 1.4 µm, under the conditions in FIGS. 4A and 4B.

It can also be seen that the shape of the first walls of the external element has an influence on the coupling efficiency. For example, this efficiency can be improved if the generating lines of the first walls are exponential type curves.

Thus, the invention provides the means of choosing the value of the coupling ratio between the laser and the waveguide.

Figure 6:
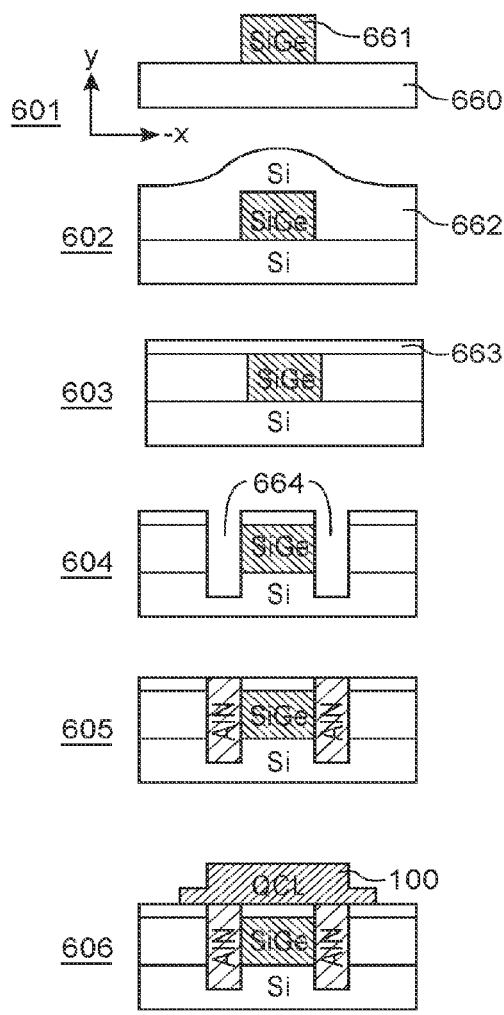
FIG. 6 illustrates an example of a method for manufacturing an optical coupler according to the invention.

FIG. 6 shows an example method of manufacturing an optical coupler according to the invention and an optical guidance system according to the invention.

Preferably, the optical coupler is made at the same time as the waveguide in which it is adapted to couple a light beam. This example corresponds to the special case in which the waveguide cladding is formed from the material of the substrate.

During a first step 601, a layer 661 of a silicon and germanium alloy is deposited by epitaxy on a silicon substrate 660. The layer 661 is then etched by lithography and etching steps to define the shape of the core of the waveguide and a blank (or general shape, or rough form) of the central element of the coupler. During this step there is no need to etch the central element in a tapered shape. A rectangular parallelepiped shape may be sufficient at this stage. As a variant, the central element is etched to its final shape directly.

In step 602, a new silicon layer 662 is deposited by epitaxy that entirely covers the portion of layer 661 remaining after etching. The new layer 662 is then planarised by Chemical Mechanical Polishing (CMP).

If required, a step 603 may be performed in which an additional layer 663 of silicon is deposited by epitaxy in order to increase the silicon thickness above the portion of the layer 661 remaining after etching. Since the additional layer 663 is deposited on a plane surface, it will also be plane.

In step 604, the silicon layer 662, and possibly 663, is (are) etched by lithography, so as to define a recess 664 in which the external element of the optical coupler will subsequently extend. Part of the layer 661 can also be etched in this step 604, to define the tapered shape of the central element. This etching can thus be used to make the intermediate element of the optical coupler that will be located between the etched recess and the central element of the coupler.

In step 605, the recess is filled in by material from which the external element of the coupler is made, forming said external element. The assembly is then planarised by CMP. As a variant, the recess is kept hollow. Therefore at this stage, the optical coupler according to the invention has been made alongside the waveguide.

In step 606, the laser 100 is bonded by epitaxy above the coupler by molecular bonding, using a thin silica layer of thickness less than or equal to 100 nm, sufficiently thick to make molecular bonding but sufficiently thin to limit absorption losses and enable coupling. This thin layer of silica may be deposited on the top of the coupler. As a variant, the external element of the coupler is made of silica and bonding uses a thin residual layer of silica inserted into the recess in step 605, and a thin layer of silica deposited directly on the laser. The laser 100 is made after epitaxy of the laser 100 has been bonded (etching of the laser guide, contact deposits and highly reflecting treatments) (see FIG. 4B).

There are advantageous particular applications of the optical coupler and the optical guidance system according to the invention in the field of gas sensors integrated on a substrate. Such sensors measure adsorption wavelengths forming the signature of a gas, these wavelengths being in the mid-infrared, in other words between 2 and 10 µm.

The optical coupler and the optical guidance system according to the invention may also be used in any other field of photonics integrated on silicon.

The invention claimed is:

1. An optical coupler integrated on a substrate, designed to optically couple a laser and a waveguide, said optical coupler comprising:
   an external element, with a base having a position starting from which two arms extend separated by a notch, said notch being delimited laterally by two first walls of the respective arms and terminating at the position of the base, a distance from one wall to the other decreasing towards a bottom of the notch;
   a central element located in the notch, delimited laterally by two second walls, and with a first region in which said two second walls are in direct contact with said two first walls as far as the bottom of the notch, the central element not extending from the notch towards the base; and
   an intermediate element, extending between the external element and the central element, directly between a first wall and a second wall where a first wall is not in direct contact with a second wall;
   an optical index of the central element being greater than an optical index of the intermediate element, itself greater than an optical index of the base of the external element.

2. The optical coupler according to claim 1, wherein the intermediate element also extends inside the notch directly on an upper face and on a lower face of the central element.

3. The optical coupler according to claim 1, wherein the central element is made of germanium or a germanium and silicon alloy.

4. The optical coupler according to claim 1, wherein the intermediate element is made of silicon or a germanium and silicon alloy.

5. The optical coupler according to claim 1, wherein the external element includes silica, aluminium oxide or aluminium nitride or a gas or a vacuum.

6. The optical coupler according to claim 5, wherein the external element is composed of an envelope containing a gas or a vacuum.

7. The optical coupler according to claim 1, comprising three slices extending one after the other and comprising:
   a first slice, designed to be located under the laser except for a laser exit region, and composed of at least part of the base of the external element;
   a second slice, directly adjacent to the first slice, and designed to be located under said laser exit region, and comprising one end of the central element; and
   a third slice, directly adjacent to the second slice.

8. The optical coupler according to claim 7, wherein said optical coupler is designed to optically couple a laser and a waveguide, such that the optical index of the first slice is less than an effective index of the laser, and the optical index of the intermediate element is higher than the effective index of the laser.

9. The optical coupler according to claim 7, wherein the first slice comprises pads containing germanium and silicon.

10. The optical coupler according to claim 7, wherein said optical coupler is designed to optically couple a laser and a waveguide such that:
    an effective index in the second slice progressively increases from entry to exit of the second slice, from a face adjacent to the first slice as far as a face adjacent to the third slice;
    the effective index at the entry to the second slice is less than an effective index of the laser; and
    the effective index at the exit from the second slice is higher than the effective index of the laser.

11. The optical coupler according to claim 7, wherein said optical coupler is designed to optically couple a laser and a waveguide such that:
    a region of the optical coupler with a same width as the optical coupler, located under the central element and in direct contact with its lower face, defines a lower cladding of the coupler;
    a region of the optical coupler with the same width as the optical coupler, located on the central element and in direct contact with its upper face, defines an upper cladding of the coupler; and
    at an exit from the second slice, an equivalent optical index of the lower cladding of the coupler and an equivalent optical index of the upper cladding of the coupler are each less than an effective index of the laser.

12. The optical coupler according to claim 7, wherein said optical coupler is designed to optically couple a laser and a waveguide such that:
    a region of the optical coupler with a same width as the optical coupler, located under the central element and in direct contact with its lower face, defines a lower cladding of the coupler; and a thickness of the lower cladding of the coupler is higher than or equal to λ0/2, where λ0 is a laser emission wavelength in a vacuum.

13. The optical coupler according to claim 7, wherein said optical coupler is designed to optically couple a laser and a waveguide such that an effective index in the third slice progressively increases from entry to exit from the third slice until it reaches a value of an effective index of the waveguide.

14. The optical coupler according to claim 1, wherein said optical coupler is designed to optically couple a quantum cascade laser and a waveguide.

15. A method of manufacturing an optical coupler according to claim 1, said method comprising the following steps:
depositing on a substrate a first layer that will form the central element, and etch the first layer;
depositing a second layer, covering the etched first layer and planarise the second layer;
etching at least the first layer to form a recess surrounding one end of the etched first layer;
filling the recess to form the external element of the optical coupler.

16. An optical guidance system integrated onto a substrate said system comprising:
an optical coupler according to claim 1;
a waveguide, located in the extension of the optical coupler such that a core of said waveguide extends in an extension of the central element and is formed from a same material as the central element, and a cladding of said waveguide extends in an extension of the intermediate element and is formed from a same material as the intermediate element; and
a laser, located above at least part of the optical coupler;
the optical coupler being designed to optically couple said laser and said waveguide.

* * * * *